United States Patent
Pfleger de Aguiar et al.

(10) Patent No.: US 12,531,880 B1
(45) Date of Patent: Jan. 20, 2026

(54) ORTHOGONAL RULE BASED IDENTIFICATION OF SECURITY EVENTS

(71) Applicant: Amazon Technologies, Inc., Seattle, WA (US)

(72) Inventors: Leandro Pfleger de Aguiar, Leander, TX (US); Vignesh Janakiraman, Frisco, TX (US); Fnu Singh Karanpreet Singh, Lake Stevens, WA (US); Shivaraj Yanamandram Kuppuraju, Cedar Park, TX (US); Vishvesh Revoori, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 217 days.

(21) Appl. No.: 18/216,233

(22) Filed: Jun. 29, 2023

(51) Int. Cl.
  *H04L 9/00* (2022.01)
  *H04L 9/40* (2022.01)

(52) U.S. Cl.
  CPC .......... *H04L 63/1416* (2013.01); *H04L 63/20* (2013.01)

(58) Field of Classification Search
  CPC ........................... H04L 63/1416; H04L 63/20
  See application file for complete search history.

(56) References Cited

U.S. PATENT DOCUMENTS

| | | | |
|---|---|---|---|
| 9,325,733 B1* | 4/2016 | Kolman | H04L 63/20 |
| 2016/0019388 A1* | 1/2016 | Singla | G06F 21/552 |
| | | | 726/23 |
| 2020/0186569 A1* | 6/2020 | Milazzo | H04L 63/08 |
| 2024/0323234 A1* | 9/2024 | Qiu | H04L 63/1425 |

OTHER PUBLICATIONS

Three recurring Security Hub usage patterns and how to deploy them (Year: 2021).*

* cited by examiner

*Primary Examiner* — Syed M Ahsan
(74) *Attorney, Agent, or Firm* — Kilpatrick Townsend & Stockton LLP

(57) ABSTRACT

An alert generation system is disclosed. The alert generation system uses rules to identify which of many network events are threats. The rules include a first set of rules as preselection rules to identify a large number of network events as not threatening, and therefore not needing to be tested against a second set of rules as detection rules, which are used to identify the threats.

20 Claims, 8 Drawing Sheets

ORTHOGONAL RULE BASED IDENTIFICATION OF SECURITY EVENTS

BACKGROUND

The subject matter described herein relates to detecting events, and more particularly to detecting events based on rules to distinguish some events from other events.

Various systems use rules to identify a subset of a large number of events as being significant. For example, electronic security systems may scan large numbers of network events to detect or identify which events are or may be related to a security threat. Also, some decision systems scan large numbers of events related to the decisions being made and may detect or identify particular events as being indicative of opportunities matching predetermined criteria. Similarly, other systems scan large numbers of events to detect or identify some of those events as having certain characteristics. Because of the large number of events being scanned and because of typically large numbers of complex rules, the systems require significant processing resources to operate. Traditional systems cannot be used for applications having numbers of events greater than thresholds set by practical processing capacity limitations because of the large numbers of complex rules used to analyze each of the large number of events.

BRIEF DESCRIPTION OF THE DRAWINGS

Various embodiments in accordance with the present disclosure will be described with reference to the drawings, in which.

DETAILED DESCRIPTION

Figure 1:
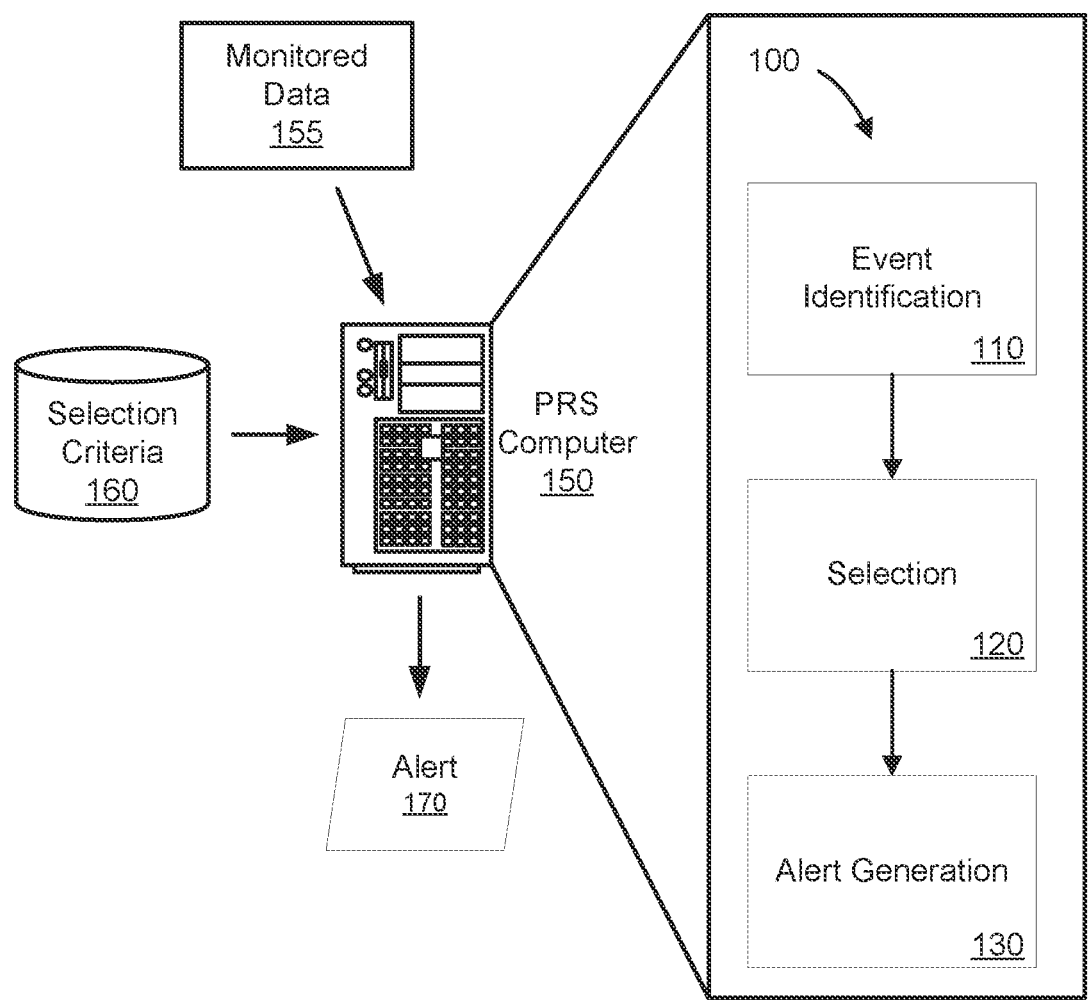
FIG. 1 is a schematic block diagram of an alert generation system according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include Production Rule Systems (PRS), which have increasingly become prominent technology to perform continuous detection of cyber threats. A PRS system is a specific type of rules engine capable of matching facts and data against a set of detection rules, for example, in the form of <conditions><actions>. By matching facts ingested via a continuous stream of events against a database of detection rules, a detection engine performs a data-driven approach to cybersecurity inference. Some PRS systems process continuously execute a list of facts against a set of detection rules in a sequence, where the first fact is executed against the set of detection rules, then the second fact is executed against the set of detection rules, and successively until all incoming facts are executed against all detection rules.

The fact scanning process has a scalability bottleneck in which the growth of the underlying compute infrastructure (and associated cost) is related to the number of expected scans on the order of the number of events times the number of detection rules.

In some embodiments disclosed herein, a system executes a set of pre-selection rules against the incoming events and those events identified by the system according to the pre-selection rules are then executed by the system against the detection rules. In some embodiments, the pre-selection rules are less complex than the detection rules, and require significantly less computational resources to execute than the detection rules. In some embodiments, there are trillions of incoming events. In some embodiments, there are tens of pre-selection rules. In some embodiments, there are thousands of detection rules. In addition, the pre-selection rules identify certain incoming events as potential threats, whereas the detection rules identify certain incoming events as threats. Accordingly, in some embodiments, the pre-selection rules are used to filter out events which are not threats, and only potentially threatening events are processed with the more complex detection rules. As a result, the number of scans or operations, for comparison, is equal to the number of events times the number of pre-selection rules plus the number of events detected by the pre-selection rules times the number of detection rules. In some embodiments, the number of scans or operations is significantly less than systems whose total scans or operations are equal to the number of events times the number of detection rules. This may occur for example because the number of preselection rules is significantly less than the number of detection rules and the number of events detected by the preselection rules is significantly less than number of incoming events.

In some embodiments, preselection and detection rules are each implemented in the form of a Boolean expression that consumes event content (e.g. to identify that a given event or event fact matches the selection criteria via pattern matching or regular expression matching) and outputs actions in the form of 1) Boolean value (true/false) indicating the positive or negative match of the event or fact against the pre-selection rule, and 2) the complete event or fact that caused the preselection rule to be identify the matching event or fact.

In some embodiments, the system generates alerts for those events or facts identified by both the preselection rules and the detection rules. The alerts may be generated according to alert rules based on logic to determine whether an alert is to be generated, and including instructions to manipulate the desired alert output. For example, an alert may include a description of an event or fact along with additional content, for example, defining criticality, and notification channels for the alert. In some embodiments, alerts may be generated using a standard format, such as ASFF (Amazon Security Finding Format), a JSON file that follows an Amazon pre-defined schema. Other formats may also be used.

In some embodiments, the system additionally processes the alerts according to an Enrichment, Suppression, and Routing (ESAR) process. The ESAR process uses a set of instructions that provide additional enrichments (for example, additional context around a certain account or user affected in the alert, or, for example, an identifier indicating that the alert is rare), additional suppressions (for example, rules to force a suppression of the alert if, for example, the matched criteria falls under conditions listed in a given "deny-list"), and additional routing (for example, to direct the output to different target queues or storages, for example, according to the identified event or fact scanned).

In some embodiments, the system stores event data and may reprocess some or all of the stored event data. For example, those events which included event facts resulting in alerts may be reprocessed. In some embodiments, the reprocessing is performed automatically, for example, as a result of programming. In some embodiments, reprocessing is performed as a result of a reprocessing command from a user. In some embodiments, reprocessing is performed without a command from the user.

FIG. 1 is a schematic block diagram of a PRS computer 150 implementing an alert generation system 100 according to some embodiments. PRS computer 150 receives monitored data 155 including, for example, network traffic or other data, and selection criteria 160, and generates alerts 170 according to the functionality of the alert generation system 100. Alert generation system 100 includes event identification component 110, selection component 120, and alert generation component 130.

PRS computer 150 may include one or more processors configured to execute instructions stored in a memory to perform the functions of the alert generation system 100, and can be implemented, for example, as a server, as a cloud computing service, for example, hosted in a data center, etc.

Event identification component 110 is configured to monitor, for example, a traffic or data environment and to identify activities of the traffic or data environment, and to compare the identified activities with event criteria. Those activities of the traffic or data environment or those combinations of activities of the traffic or data environment matching the event criteria are identified as events.

For example, an event identification component 110 of an alert generation system 100 configured to detect network security related events for a network may be configured to monitor properties or qualities of all or a portion of the monitored data 155 including, for example, electronic communication traffic metadata of a network (e.g. source and destination IP and Port logs), user activity (e.g. logon and logoff event records), data plane events (e.g. resource operations performed on a cloud resource), management events (e.g. cloud console control commands performed), and application logs (e.g. API call and response codes and error messages). The properties or qualities may include traffic or data samples, aspects of the traffic or data samples, combinations of traffic or data samples, and combinations of aspects of the traffic or data samples. In addition, the event identification component 110 may compare one or more of the properties or qualities with stored event criteria. In addition, the alert generation system 100, may identify those traffic or data samples, aspects of the traffic or data samples, combinations of the traffic or data samples, and combinations of the aspects of the traffic or data samples matching the event criteria as events.

Event identification component 110 is also configured to generate data corresponding to the identified events. In some embodiments, the generated data communicates various aspects of the identified events. For example, the generated data may communicate a type, class, or category of each of the events. For example, an identified event may include a request for a service, such as a download of data, where the identified event includes an identification of a user account, a device type, a browser type, an operating system, an IP address, and a geographic location.

Selection component 120 is configured to receive information of events from event identification component 110, and to compare the event information with selection criteria to identify which events match the selection criteria.

For example, a selection component 120 of an alert generation system 100 configured to detect network security related events for a network may be configured to receive the data generated by event identification component 110 identifying events found by event identification component 110. The selection component 120 may be further configured to monitor the identified events found by event identification component 110 and to compare the identified events with certain criteria. For example, the selection component might be used to select events belonging to a certain group of accounts from a particular set of event types (e.g. iam.amazonaws.com) for further analysis and to exclude events from certain accounts (e.g. from non-critical, non-production, or event-noisy accounts) from further analysis. Those monitored events or those combinations of monitored events matching the selection criteria and therefore selected for further analysis are identified as security events.

The selection component 120 may also be configured to generate data corresponding to the identified security events. In some embodiments, the generated data communicates various aspects of the identified security events. For example, the generated data may communicate a type, class, or category of each of the security events. For example, in the following CloudTrail IAM example, the selection component could be used to pre-select only events where the "userIdentity" "type" would match the String 'Root', as a means to exclude non-privileged events from the selection stage (i.e. in the example below, that particular record would not have been selected).

```
{"Records": [{
  "eventVersion": "1.0",
  "userIdentity": {
    "type": "IAMUser",
    "principalId": "EX_PRINCIPAL_ID",
    "arn": "arn:aws:iam::123456789012:user/Alice",
    "accessKeyId": "EXAMPLE_KEY_ID",
    "accountId": "123456789012",
    "userName": "Alice"
  },
  "eventTime": "2014-03-06T21:22:54Z"
  "eventSource": "ec2.amazonaws.com",
  "eventName": "StartInstances",
  "awsRegion": "us-east-2",
  "sourceIPAddress": "205.251.233.176",
  "userAgent": "ec2-api-tools 1.6.12.2",
  "requestParameters": {"instancesSet": {"items": [{"instanceId": "i-ebeaf9e2"}]}},
  "responseElements": {"instancesSet": {"items": [{
    "instanceId": "i-ebeaf9e2",
    "currentState": {
      "code": 0,
      "name": "pending"
    },
    "previousState": {
      "code": 80,
```

-continued

```
            "name": "stopped"
          }
        }]}}
    }]}
```

The alert generation component 130 is configured to receive information from the selection component 120, where the received information characterizes the security events identified by the selection component 120. The alert generation component 130 generates alerts for those security events identified by the selection component 120. The alerts may be generated according to alert rules based on logic to determine whether an alert is to be generated, and including instructions to manipulate the desired alert output. For example, the characterizing information may include a description of an event along with additional content, for example, defining criticality, and notification channels for the alert. In some embodiments, alerts may be generated using a standard format, such as ASFF (Amazon Security Finding Format), a JSON file that follows an Amazon pre-defined schema. Other formats may be used.

Figure 2:
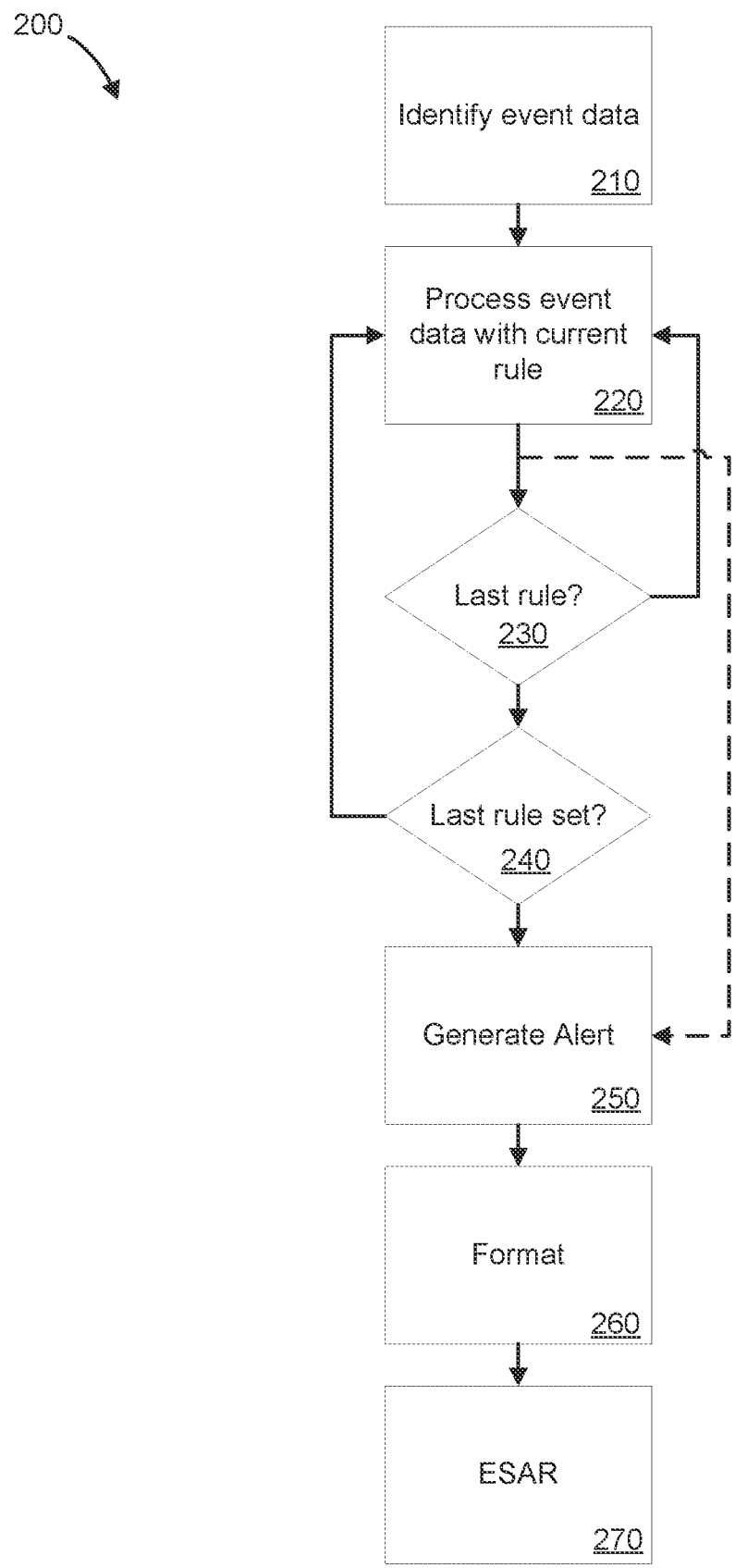
FIG. 2 is a schematic flowchart diagram illustrating a method of generating alerts based on events according to some embodiments.

FIG. 2 is a schematic flowchart diagram illustrating a process 200 of generating alerts based on events, facts, or combinations of events and facts according to some embodiments.

Some or all of the process 200 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 200 may be performed, for example, by a system having features similar or identical to those of alert generation system 100.

At 210, the system identifies one or more events, facts, or combinations of events and facts. For example, an event identification component having features similar or identical to those of event identification component 110 may be used to identify the one or more events, facts, or combinations of events and facts.

At 220, the system determines whether any of the events identified at 210 and not eliminated by a previous occurrence of 240, whether any fact of any of the events identified at 210 and not eliminated by a previous occurrence of 240, and whether any combination of the events and/or facts of the events identified at 210 and not eliminated by a previous occurrence of 240 may form the basis for an alert, and are, therefore, potential security events. For example, a selection component having features similar or identical to those of selection component 120 may be used to receive information of the events, facts, or combinations of events and facts identified at 210 and not eliminated by previous occurrences of 240, and to compare the event information with selection criteria based on a particular rule of a particular rule set of a group of rule sets to identify which events, facts, or combinations match the selection criteria, and therefore may possibly be a security event which would stimulate, initiate, or cause an alert.

In some embodiments, at 220, the system determines whether any of the events identified at 210, whether any fact of any of the events identified at 210, and whether any combination of the events and/or facts of the events identified at 210 form the basis for an alert, and are, therefore, security events, and at 250, corresponding alerts are generated.

In some cases, one or more of the events, facts, or combinations of events and facts may not be properly processed by the particular rule. In some embodiments, the system is configured to store information related to the events, facts, or combinations of events and facts and the particular rule for further processing at a later time, once the cause for the improper processing or the inability to process is addressed. In addition, the system is configured to access the stored information and to successfully process the events, facts, or combinations of events and facts according to the particular rule after the cause is remediated.

In some embodiments, a group of events, facts, or combinations of events and facts are identified at 210 before any of the identified events, facts, or combinations of events and facts are processed at 220.

At 230, the system determines whether the particular rule of the rule set used at the most recent occurrence of 220 to identify which events, facts, or combinations of events and facts match the selection criteria is the last rule of the particular rule set to be used, or, whether instead, another rule of the particular rule set is to be used.

If, at 230, the system determines that the particular rule used at the most recent occurrence of 220 is not the last rule to be used, the system identifies a next rule of the particular rule set to use, and returns to 220. In some embodiments, the next rule to use is identified based at least in part on whether or not the criteria of one or more previous rules have been met by one or more previously processed events, facts, or combinations of events and facts.

Otherwise, if, at 230, the system determines that the particular rule used at the most recent occurrence of 220 is the last rule to be used, at 240, the system may eliminate those events, facts, or combinations not matching selection criteria of the particular rule set from further processing. Accordingly, the number of events, facts, or combinations processed by a next rule set is less than that processed by a previous rule set. In addition, at 240, the system determines whether the particular rule set used at the most recent occurrence of 220 to identify which events, facts, or combinations of events and facts match the selection criteria is the last rule set of the group of rule sets to be used, or, whether instead, another rule set of the group of rule sets is to be used.

If, at 240, the system determines that the particular rule set used at the most recent occurrence of 220 is not the last rule set to be used, the system identifies a next rule set to use, and returns to 220.

Otherwise, if, at 240, the system determines that the particular rule set used at the most recent occurrence of 220 is the last rule set to be used, at 250, one or more alerts are generated based on those events, facts, or combinations matching the selection criteria of the most recent occurrence of 220, as graphically illustrated in the figure.

Accordingly, in some embodiments, the series of rule sets used for each event, group of facts, or combinations function as a series of filters, where each filter excludes certain events, groups of facts, or combinations, and only those events, groups of facts, or combinations passing through the last rule of the last rule set are identified as security events.

At 250, an alert generation system such as the alert generation component 130 may generate an alert based on various aspects of the identified security events. For example, the alert generation system may receive information characterizing the security events identified by the combination of 220, 230, and 240. The alert generation system may generate alerts for the security events according to alert rules, for example, to determine whether an alert is to be generated, and including instructions to formulate the alerts. For example, the characterizing information may include a description of the events, facts, or combinations of events and facts precipitating the alert. The alerts may include additional content, for example, defining criticality, and notification channels for the alert.

In some embodiments, at 260, the alerts generated at 250 are formatted or reformatted with a standard format, such as ASFF (Amazon Security Finding Format), a JSON file that follows an Amazon pre-defined schema. Other formats may also be used.

In some embodiments, at 270, the alerts generated at 250, and optionally formatted or reformatted at 260 are further processed according to an Enrichment, Suppression, and Routing (ESAR) methodology. For example, the further processing may provide additional enrichments, such as additional context related to a particular account or user receiving the alert. The further processing may additionally or alternatively provide suppressions, for example, according to rules which would cause alerts to be suppressed, for example, by not transmitting the alerts. Identifying which alerts to suppress may include comparing alerts with a "deny-list" providing characteristics of alerts which are to be suppressed. In some embodiments, the further processing may additionally or alternatively provide transmission instructions, for example to direct the alerts to different target queues or storages depending on the contents of the alerts.

Figure 3:
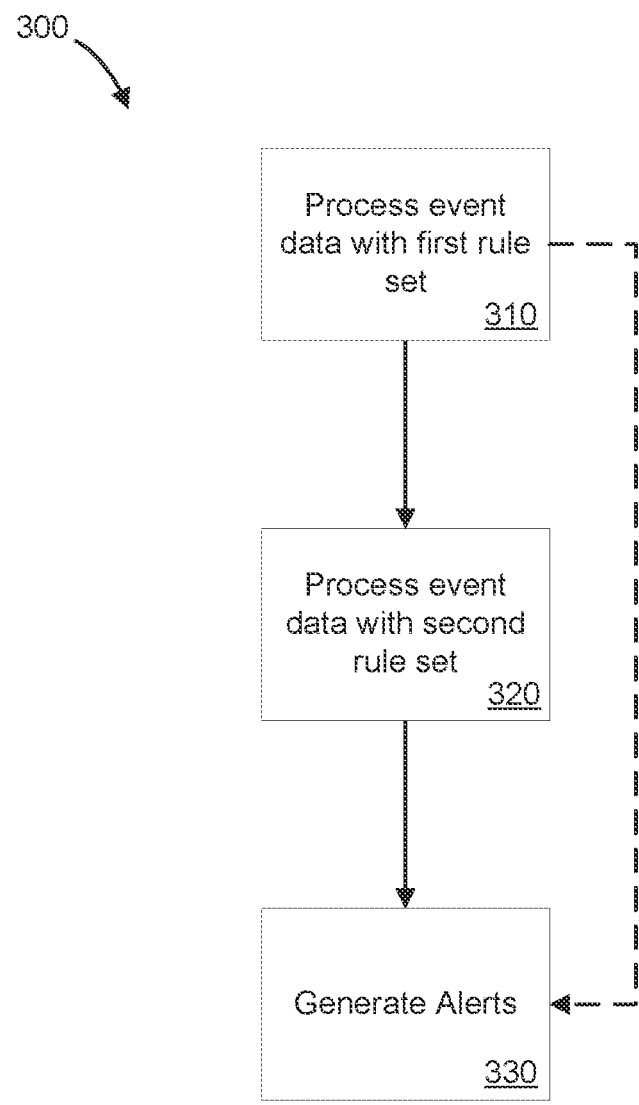
FIG. 3 is a schematic flowchart diagram illustrating a method of generating alerts based on events according to some embodiments.

FIG. 3 is a schematic flowchart diagram illustrating a process 300 of generating alerts based on events, facts, or combinations of events and facts according to some embodiments. The process 300 may be performed, for example, by a system having features similar or identical to those of alert generation system 100.

At 310, the system determines whether any of the events, facts, or combinations of events and facts may form the basis for an alert according to a first set of rules, and are, therefore, potential security events. In some embodiments, the first set of rules are preselection rules. For example, a selection component having features similar or identical to those of selection component 120 may be used to receive information of the events, facts, or combinations of events and facts, and to compare the received event information with selection criteria based on the rules of a first set of rules to identify which events, facts, or combinations match the selection criteria, and therefore may possibly be a security event which would stimulate, initiate, or cause an alert. Those events, facts, or combinations which may possibly be a security event which would stimulate, initiate, or cause an alert are identified as candidate security events. In some embodiments, events, facts, or combinations which are not identified as candidate security events are eliminated from further processing so that, for example, the number of events facts or combinations processed with a next set of rules is less than about processed with the first set of rules.

In some embodiments, at 310, the system determines whether any of the events, facts, or combinations of events and facts form the basis for an alert, and are, therefore, security events, and at 330, corresponding alerts are generated.

At 320, the system determines whether any of the candidate security events are security events according to a second set of rules. In some embodiments, the second set of rules are detection rules. For example, a selection component having features similar or identical to those of selection component 120 may be used to receive information of the candidate security events, and to compare the received event information with selection criteria based on the rules of a second set of rules to identify which candidate security events match the selection criteria, and therefore are security events which would stimulate, initiate, or cause an alert.

At 330, one or more alerts are generated based on those events, facts, or combinations matching identified at 320 as security events. Accordingly, in some embodiments, the series of first and second rule sets used for each event, group of facts, or combinations function as filters, where each filter is configured to excludes certain events, groups of facts, or combinations, and only those events, groups of facts, or combinations passing through the second rule set are identified as security events.

In some embodiments, an alert generation system such as the alert generation component 130 generates alerts based on various aspects of the identified security events. For example, the alert generation system may receive information characterizing the security events identified by the combined filtering effect of 310 and 320. In addition, the alert generation system may generate alerts for the security events according to alert rules, for example, to determine whether an alert is to be generated, and including instructions for formulating the alerts. For example, the characterizing information may include a description of the events, facts, or combinations of events and facts precipitating the alerts. In some embodiments, the alerts include additional content, for example, defining criticality, and notification channels for the alert.

Figure 4:
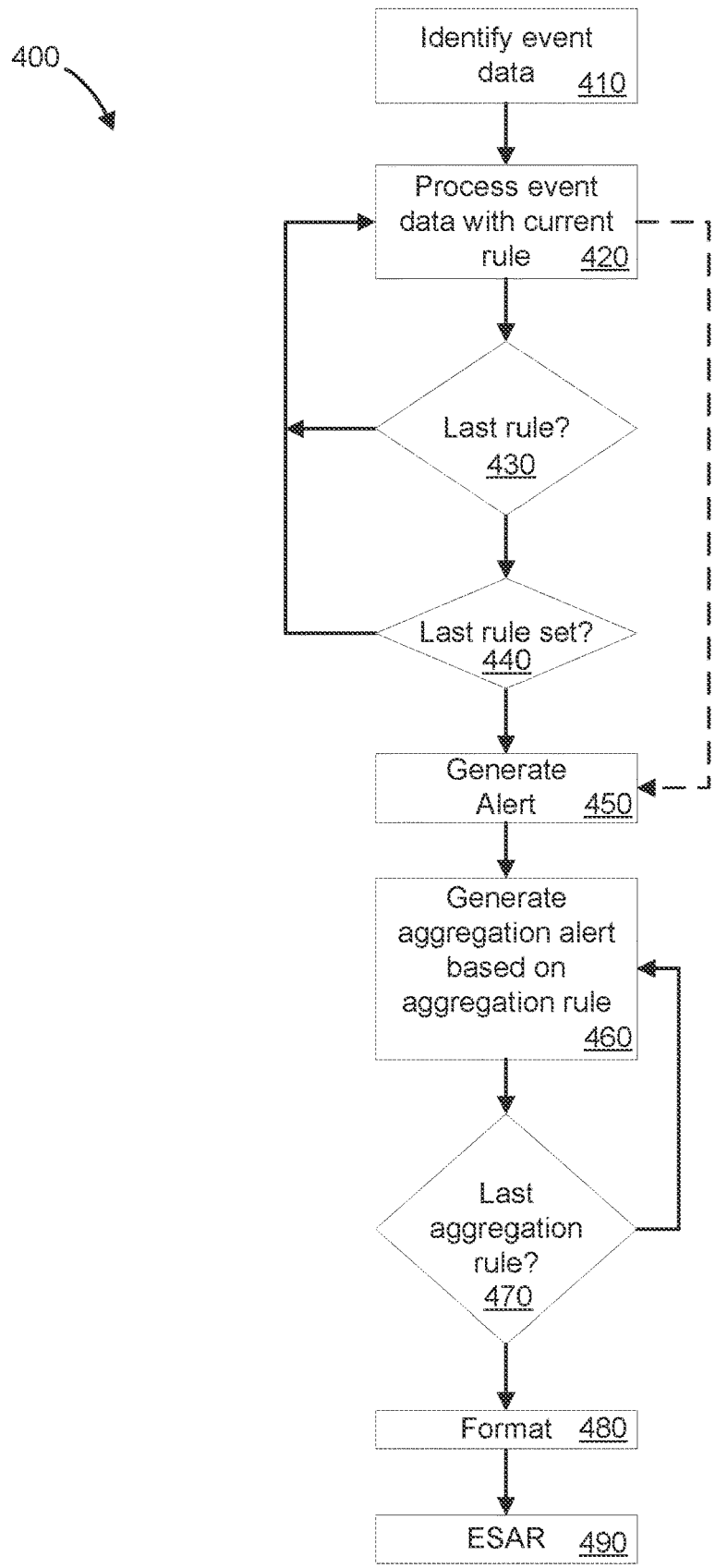
FIG. 4 is a schematic flowchart diagram illustrating a method of generating alerts based on events according to some embodiments.

FIG. 4 is a schematic flowchart diagram illustrating a process 400 of generating alerts based on events, facts, or combinations of events and facts according to some embodiments. The process 400 may be performed, for example, by a system having features similar or identical to those of alert generation system 100.

At 410, the system identifies one or more events, facts, or combinations of events and facts. For example, an event identification component having features similar or identical to those of event identification component 110 may be used to identify the one or more events, facts, or combinations of events and facts.

At 420, the system determines whether any of the events, facts, or combinations of events and facts identified at 410 and not eliminated by a previous occurrence of 440 may form the basis for an alert, and are, therefore, potential security events. For example, a selection component having features similar or identical to those of selection component 120 may be used to receive information of the events, facts, or combinations of events and facts identified at 410 and not eliminated by a previous occurrence of 440, and to compare the event information with selection criteria based on a particular rule of a particular rule set of a group of rule sets to identify which events, facts, or combinations match the selection criteria, and therefore may possibly be a security event which would stimulate, initiate, or cause an alert.

In some embodiments, a group of events, facts, or combinations of events and facts are identified at 410 before any of the identified events, facts, or combinations of events and facts are processed at 420.

In some embodiments, at 420, the system determines whether any of the events identified at 410, whether any fact of any of the events identified at 410, and whether any combination of the events and/or facts of the events identified at 410 form the basis for an alert, and are, therefore, security events, and at 450, corresponding alerts are generated.

At 430, the system determines whether the particular rule of the rule set used at the most recent occurrence of 420 to identify which events, facts, or combinations of events and facts match the selection criteria is the last rule of the particular rule set to be used, or, whether instead, another rule of the particular rule set is to be used. If the system determines that the particular rule used at the most recent occurrence of 420 is not the last rule to be used, the system identifies a next rule of the particular rule set to use, and returns to 420. In some embodiments, the next rule to use is identified based at least in part on whether or not the criteria of one or more previous rules have been met by one or more previously processed events, facts, or combinations of events and facts.

Otherwise, if, at 430, the system determines that the particular rule used at the most recent occurrence of 420 is the last rule to be used, at 440, the system may eliminate those events, facts, or combinations not matching selection criteria of the particular rule set from further processing. Accordingly, the number of events, facts, or combinations processed by a next rule set is less than that processed by a previous rule set. In addition, at 440, the system determines whether the particular rule set used at the most recent occurrence of 420 to identify which events, facts, or combinations of events and facts match the selection criteria is the last rule set of the group of rule sets to be used, or, whether instead, another rule set of the group of rule sets is to be used. If the system determines that the particular rule set used at the most recent occurrence of 420 is not the last rule set to be used, the system identifies a next rule set to use, and returns to 420.

Otherwise, if, at 440, the system determines that the particular rule set used at the most recent occurrence of 420 is the last rule set to be used, at 450, one or more alerts are generated based on those events, facts, or combinations matching the selection criteria of the most recent occurrence of 420, as graphically illustrated in the figure.

Accordingly, in some embodiments, the series of rule sets used for each event, group of facts, or combinations function as a series of filters, where each filter excludes certain events, groups of facts, or combinations, and only those events, groups of facts, or combinations passing through the last rule of the last rule set are identified as security events.

At 450, an alert generation system such as the alert generation component 130 may generate an alert based on various aspects of the identified security events. For example, the alert generation system may receive information characterizing the security events identified by the combination of 420, 430, and 440. The alert generation system may generate alerts for the security events according to alert rules, for example, to determine whether an alert is to be generated, and including instructions to formulate the alerts. For example, the characterizing information may include a description of the events, facts, or combinations of events and facts precipitating the alerts, and the alerts may include additional content, such as: at least a portion of the characterizing information, information defining criticality, and information identifying notification channels for the alerts.

At 460, an aggregation alert generation system such as the alert generation component 130 may generate an aggregation alert based on various aspects of the alerts identified at 450. In some embodiments, the aggregation alert generation system determines whether any combination of the alerts identified at 450 or any combination of the events and facts of any combination of the alerts identified at 450 form the basis for an aggregation alert.

For example, a selection component having features similar or identical to those of selection component 120 may be used to receive alert information characterizing alerts identified at 450 and/or the events and facts of the alerts identified at 450, and to compare the received alert information with selection criteria based on a particular aggregation rule of a set of aggregation rules to identify which combination of the alerts identified at 450 or combination of the events and facts of any combination of the alerts identified at 450 match the selection criteria, and therefore collectively form an aggregation security event which would stimulate, initiate, or cause an aggregation alert. In some embodiments, the alert information may include a description of alerts identified at 450 and/or the security events precipitating the alerts identified at 450, and the aggregation alerts may include additional content, such as: at least a portion of the alert information, information defining criticality, and information identifying notification channels for the aggregation alerts.

At 470, the system determines whether the particular aggregation rule of the aggregation rule set used at the most recent occurrence of 460 to identify which combination of the alerts identified at 450 or any combination of the events and facts of any combination of the alerts identified at 450 match the selection criteria is the last aggregation rule of the aggregation rule set to be used, or, whether instead, another aggregation rule is to be used. If the system determines that the aggregation rule used at the most recent occurrence of 460 is not the last aggregation rule to be used, the system identifies a next aggregation rule of the particular aggregation rule set to use, and returns to 460. In some embodiments, the next aggregation rule to use is identified based at least in part on whether or not the criteria of one or more previous rules or aggregation rules have been met by one or more previously processed alerts, events, facts, or combinations of events and facts.

In some embodiments, at 480, the alerts generated at 450 and 460 are formatted or reformatted with a standard format, such as ASFF (Amazon Security Finding Format), a JSON file that follows an Amazon pre-defined schema. Other formats may be used.

In some embodiments, at 490, the alerts generated at 450 and 460, and optionally formatted or reformatted at 480 are further processed according to an Enrichment, Suppression, and Routing (ESAR) methodology. For example, the further processing may provide additional enrichments, such as additional context related to a particular account or user receiving the alert. The further processing may additionally or alternatively provide suppressions, for example, according to rules which would cause alerts to be suppressed, for example, by not transmitting the alerts. Identifying which alerts to suppress may include comparing alerts with a "deny-list" providing characteristics of alerts which are to be suppressed. In some embodiments, the further processing may additionally or alternatively provide transmission instructions, for example to direct the alerts to different target queues or storages depending on the contents of the alerts.

Figure 5:
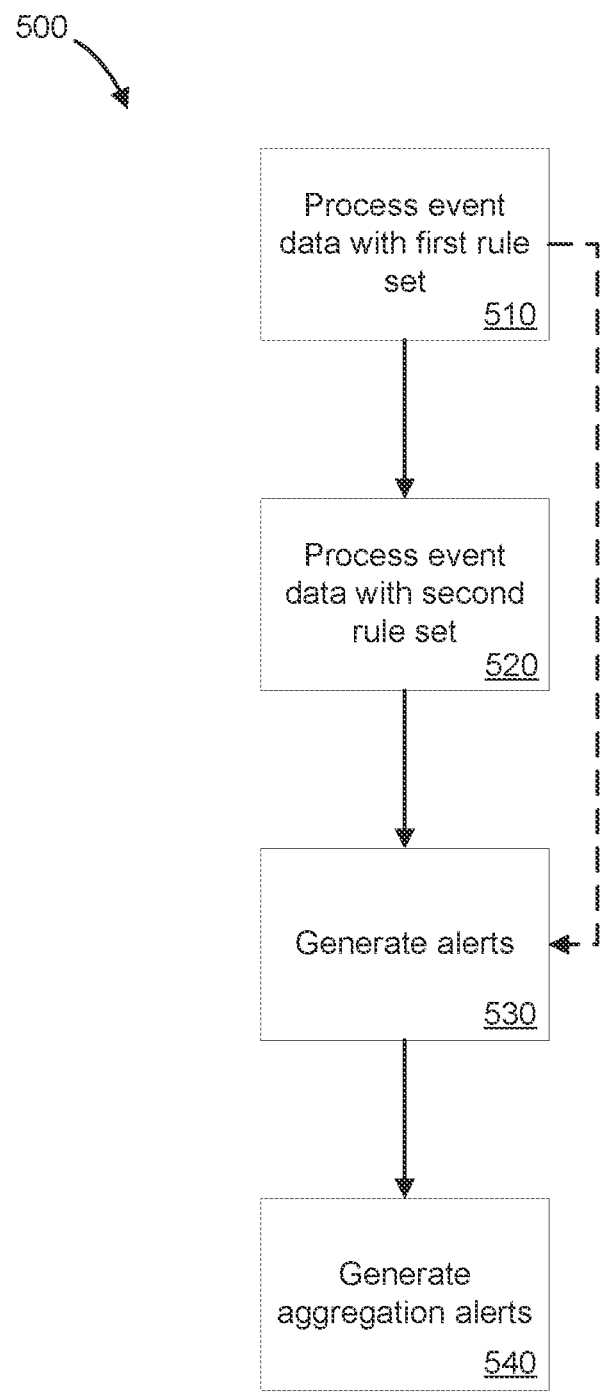
FIG. 5 is a schematic flowchart diagram illustrating a method of generating alerts based on events according to some embodiments.

FIG. 5 is a schematic flowchart diagram illustrating a process 500 of generating alerts based on events, facts, or combinations of events and facts according to some embodiments. The process 500 may be performed, for example, by a system having features similar or identical to those of alert generation system 100.

At 510, the system determines whether any of the events, facts, or combinations of events and facts may form the basis for an alert according to a first set of rules, and are, therefore, potential security events. In some embodiments, the first set of rules are preselection rules. For example, a selection component having features similar or identical to those of selection component 120 may be used to receive information of the events, facts, or combinations of events and facts, and to compare the received event information with selection criteria based on the rules of a first set of rules to identify which events, facts, or combinations match the selection criteria, and therefore may possibly be a security event which would stimulate, initiate, or cause an alert. Those events, facts, or combinations which may possibly be a security event which would stimulate, initiate, or cause an alert are identified as candidate security events. In some embodiments, events, facts, or combinations which are not identified as candidate security events are eliminated from further processing so that, for example, the number of events facts or combinations processed with a next set of rules is less than about processed with the first set of rules.

In some embodiments, at 510, the system determines whether any of the events, facts, or combinations of events and facts form the basis for an alert, and are, therefore, security events, and at 530, corresponding alerts are generated.

At 520, the system determines whether any of the candidate security events are security events according to a second set of rules. In some embodiments, the second set of rules are detection rules. For example, a selection component having features similar or identical to those of selection component 120 may be used to receive information of the candidate security events, and to compare the received event information with selection criteria based on the rules of a second set of rules to identify which candidate security events match the selection criteria, and therefore are security events which would stimulate, initiate, or cause an alert.

At 530, one or more alerts are generated based on those events, facts, or combinations matching identified at 520 as security events. Accordingly, in some embodiments, the series of first and second rule sets used for each event, group of facts, or combinations function as filters, where each filter is configured to excludes certain events, groups of facts, or combinations, and only those events, groups of facts, or combinations passing through the second rule set are identified as security events.

At 540, aggregation alerts are generated based on various aspects of the alerts identified at 530. For example, whether any combination of the alerts identified at 530 or any combination of the events and facts of any combination of the alerts identified at 530 form the basis for an aggregation alert may be determined. For example, information of the events and facts of the alerts identified at 530 may be compared with selection criteria based on a particular aggregation rule of a set of aggregation rules to identify which combination of the alerts identified at 530 or combination of the events and facts of any combination of the alerts identified at 530 match the selection criteria, and therefore collectively form an aggregation security event which would stimulate, initiate, or cause an aggregation alert.

In some embodiments, the aggregation alerts are generated based on various aspects of the identified security events. For example, information characterizing the security events may be used to generate aggregation alerts for the security events according to aggregation alert rules, for example, to determine whether an aggregation alert is to be generated, and including instructions for formulating the aggregation alerts. For example, the characterizing information may include a description of the events, facts, or combinations of events and facts precipitating the aggregation alerts. In some embodiments, the aggregation alerts include additional content, for example, defining criticality, and notification channels for the aggregation alert.

Figure 6:
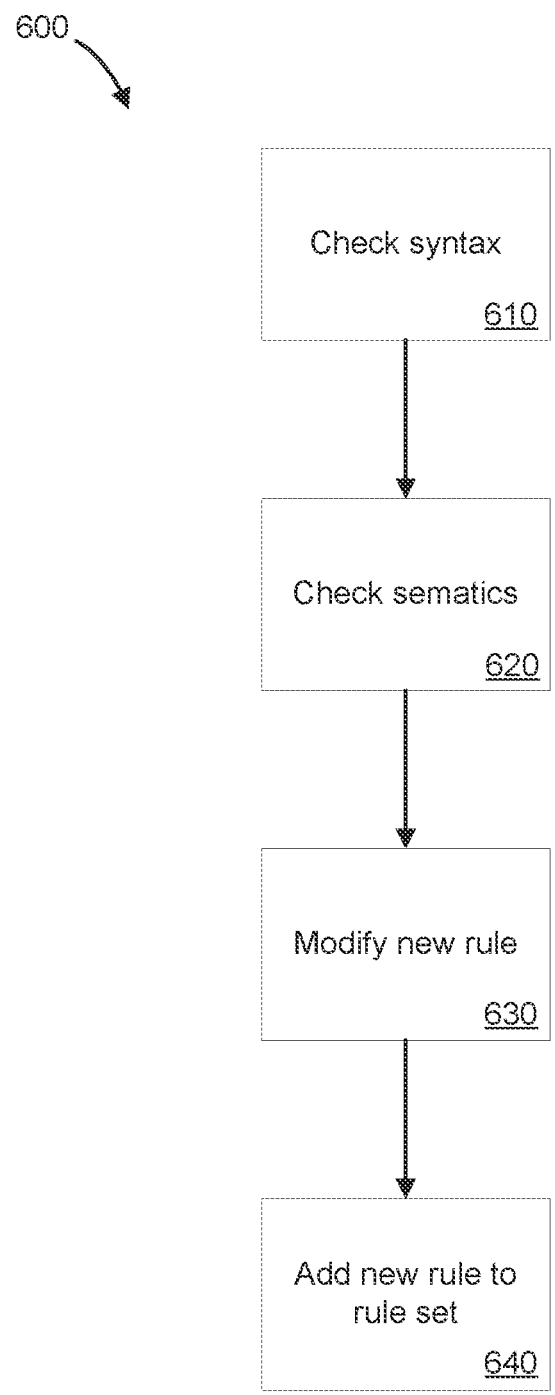
FIG. 6 is a schematic flowchart diagram illustrating a method of generating rules for an alert generation system according to some embodiments.

FIG. 6 is a schematic flowchart diagram illustrating a process 600 of generating rules for an alert generation system according to some embodiments.

In some embodiments, preselection or detection rules for are deployed using a Rule Deployment Optimization Service (RDOS) responsible for maximizing the reuse of preselection and detection rules across subsequent processing steps. For example, in the case of multi-tenant access, users might create independent new preselection or detection rules without previous knowledge that similar preexisting rules would match the intended behavior of the new rule. The RDOS determines the overlap between the new and preexisting rules to minimize the number of repeated patterns (for example, assertions) across all rule sets.

In some embodiments, at 610 and 620, the RDOS respectively performs syntax and semantic checks.

In some embodiments, at 630, overlapping matching criteria across rules are identified. In addition, the new rules are modified by removing the portions of the new rules overlapping preexisting rules. In some embodiments, rules having overlapping matching criteria are consolidated. In some embodiments, report data characterizing any or all of the overlapping matching criteria across rules, the removed overlapping portions of the new rules, and the consolidation is additionally generated. In some embodiments, a report including the generated report data is created.

At 640, the new rules are added to the preexisting rules and are available for use, for example, by an alert generation system.

In some embodiments, an alert generation system may be at least partially a machine learning system.

Figure 7:
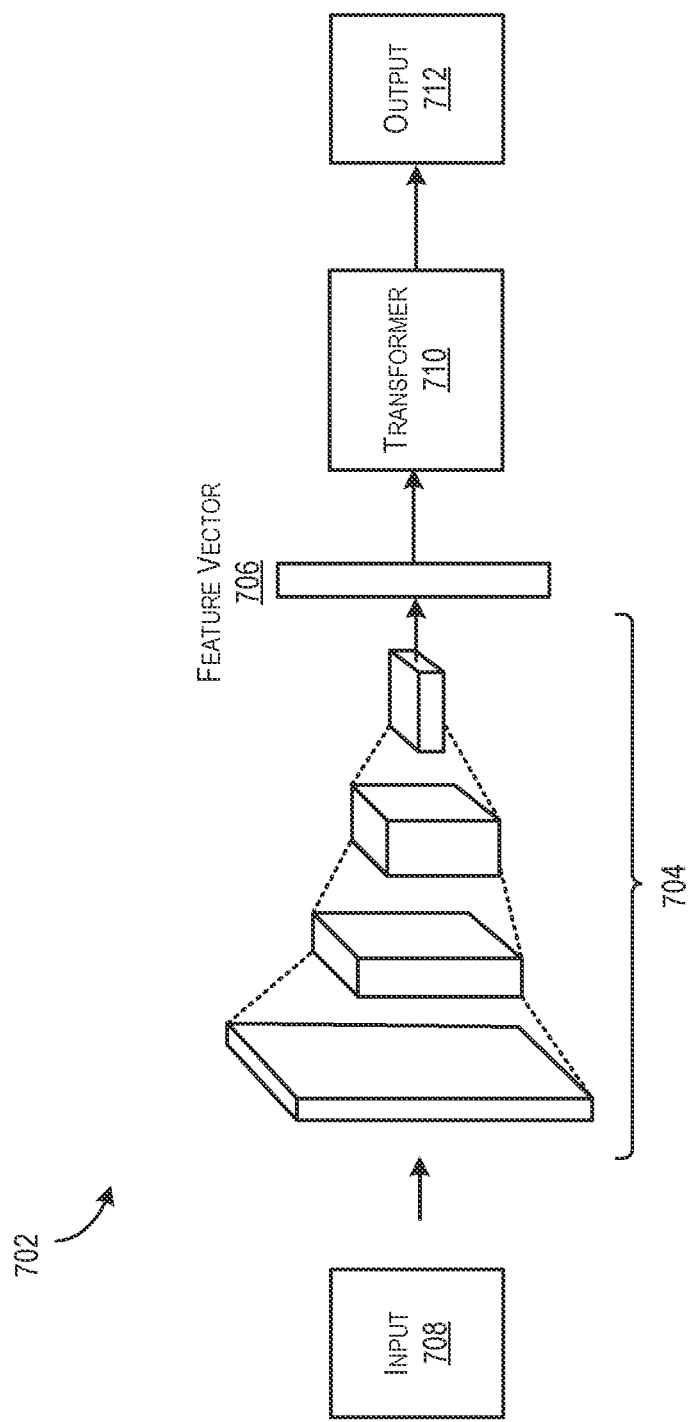
FIG. 7 is a schematic block diagram of an alert generation system according to some embodiments.

FIG. 7 is a schematic block diagram illustrating techniques for machine learning based alert generation, in accordance with some embodiments. FIG. 7 depicts the training and utilization of neural network 702. As depicted, the neural network 702 may be on include a convolutional neural network having any suitable number of layers 704. The convolutional neural network may be of a class of deep neural networks, and may be used to identify patterns in events, facts, or combinations of events and facts which elicit or provoke or cause alerts. Layers 704 may include any suitable convolutional layer (e.g., configured to detect certain features of the input based on one or more filters, a layer that performs a convolution operation to input and passes the result to the next layer), rectified linear unit layers (e.g., configured to remove unwanted numbers such as negative numbers), pooling layers (e.g., layers that take a larger input and distill the input to a smaller form), and flattening layers (e.g., a layer configured to convert two-dimensional arrays from pooled features into a single, long continuous linear vector).

Neural network 702 may be configured to generate feature vector 706 from input 708 by passing input 708 incrementally through layers 704. Input 708 may be, for example, events, facts, or combinations of events and facts, as discussed elsewhere herein.

Transformer 710 may be configured with any suitable number of additional layers such as flattening layers (e.g., a layer configured to convert two-dimensional arrays from pooled features into a single, long continuous linear vector), fully connected layers (e.g., layers in which every input of a vector generated by one or more previous layers is connected to a corresponding portion of an output vector), and soft-max layers (e.g., a layer configured to turn values of an output vector to values that, when summed together, add up to 1 or a predefined maximum value).

In some embodiments, transformer 710 may be configured to process sequential data. By way of example, subportions of the input 708 may be individually processed through layers 704 to generate feature vector 706. Transformer 710 may be configured to classify by processing the feature vector 706 through one or more additional layers as including, or not including events, facts, or combinations of events and facts which would elicit an alert. As the portions of the input 708 are processed, the transformer 710 may be configured to identify when a portion of the input 708 is encountered that does or does not elicit an alert. Transformer 710 may then generate output 712 including, for example, one or more of: an alert, attributes of an alert, and a command to generate an alert.

Although not depicted, the neural network 702 may include weights corresponding to each portion of a fully connected layer. These weights express connection strengths between each value and a corresponding category or classification. Additionally, the neural network 702 may be configured with hyperparameters (not depicted) which may be predefined and user configurable. These hyperparameters may identify how many features are to be utilized for each convolutional layer, what window size or stride is used for each pooling layer, a number of hidden neurons to be used for each fully connected layer, or the like.

In some embodiments, neural network 702 may be initialized with random or predefined weights. Through a training process, the neural network 702 may be trained to identify security events from events, facts, or combinations of events and facts input based at least in part on a training data set (not depicted) for which input events, facts, or combinations of events and facts are known to be security events. The input from an example of the training data set may be processed by the neural network 702 and the security events produced for that example may be compared to the known security events. Any error found between the security events generated for that input and the known security events may be used to modify the weights of the neural network 702. The process may be repeated any suitable number of times until error between the output produced by the neural network 702 is within a threshold of accuracy to known values. By way of example only, the neural network 702 may be trained and weights adjusted until output produced by the neural network 702 is within a threshold accuracy error or a threshold accuracy percentage.

Once trained, neural network 702 may be used to identify security events from input events, facts, or combinations of events and facts, as discussed elsewhere herein. The output model can be used either as input for the pre-selection or selection stage or called on-demand, as part of the ESAR stage, as a means to increase or decrease the desired criticality of certain alert output.

In some embodiments, a neural network similar or identical to neural network 702 is trained and used to perform ESAR functions, for example, as described herein.

In some embodiments, a neural network similar or identical to neural network 702 is trained and used to generate preselection and/or detection rules, for example, from a high level natural language description of the detection use case, for example, using a large language model. For example, when used, the neural network may receive natural language text representing rules, and convert the received text into rules of usable form and syntax for a computer implemented alert generation system, for example, appropriate for a particular target domain. For example, rules for a Splunk domain may be generated according to an SPL format. Similarly, rules for a Microsoft domain may be generated according to a KQL format.

Figure 8:
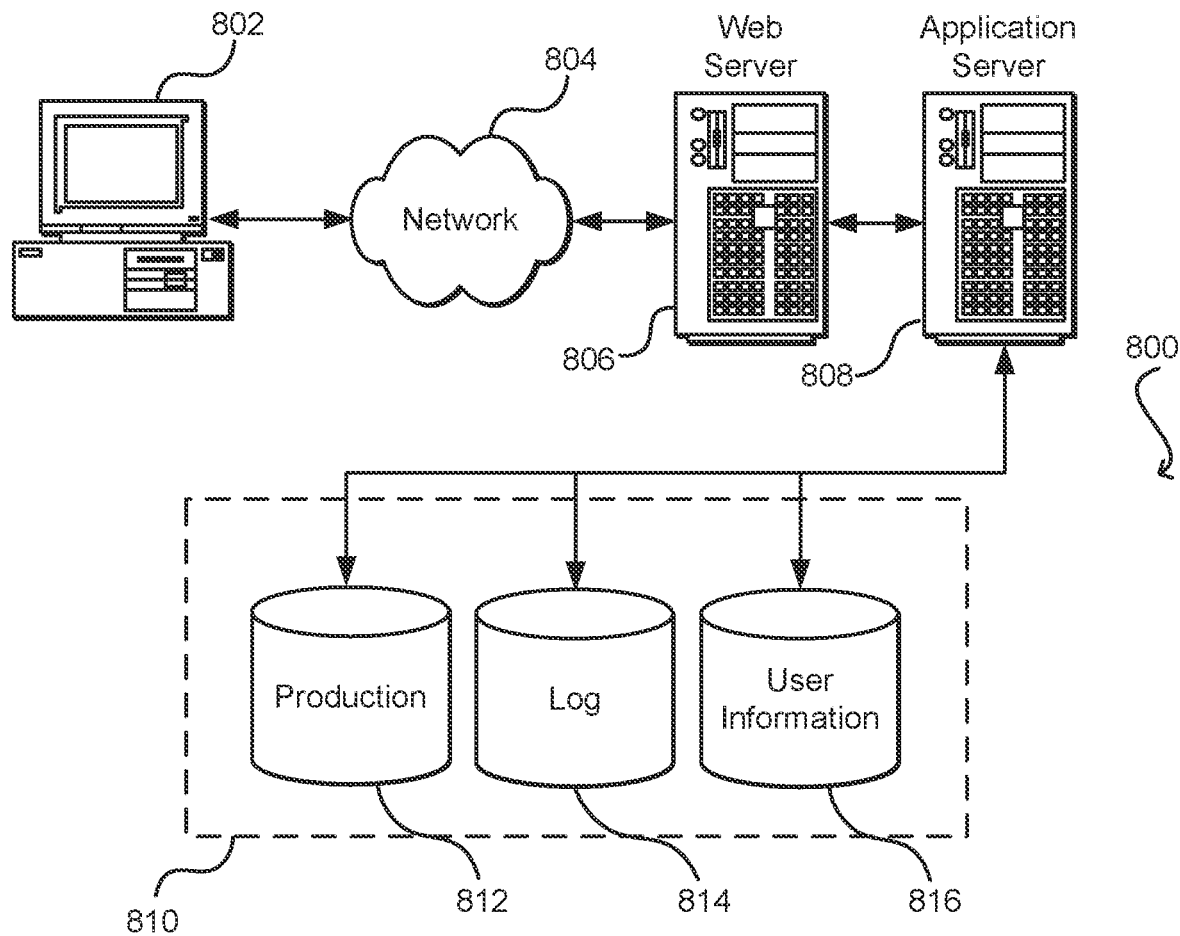
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a result listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method implemented by a computer system, the computer-implemented method comprising:
   identifying event data that includes information related to one or more computer network events;
   determining one or more security events in a multi-stage process by at least:
      identifying, in a first stage of the multi-stage process, a first rule set of a plurality of rule sets, the first rule set comprising first rules for identifying potential security events;
      executing, in the first stage, at least one of the first rules to determine that at least one of:
         A) a particular event or combination of events of the event data,
         B) a particular fact or combination of facts of one or more events of the event data, and
         C) a combination of one or more events and one or more facts of one or more events of the event data
      is or continues to be a potential security event,
      identifying, in a second stage of the multi-stage process, a second rule set of the plurality of rule sets, the second rule set comprising second rules for identifying security events, the second rules being more complex than the first rules;
      executing, in the second stage and independently of the execution of the at least one of the first rules, at least one of the second rules to determine that the potential security event is or continues to be a security event;

generating a security alert based on the one or more security events;

identifying a next aggregation rule of an aggregation rule set;

generating, based on the next aggregation rule, an aggregation alert based on a combination of security events;

formatting the security alert and the aggregation alert; and processing the formatted security alert and the aggregation alert according to an Enrichment, Suppression, and Routing (ESAR) methodology.

2. The computer-implemented method of claim 1, wherein executing at least one of the first rules comprises executing a pre-selection rule, and wherein the pre-selection rule is used to determine that at least one of:

A) a particular event or combination of events of the event data,

B) a particular fact or combination of facts of one or more events of the event data, and C) a combination of one or more events and one or more facts of one or more events of the event data is or continues to be a potential security event.

3. The computer-implemented method of claim 1, wherein executing at least one of the second rules comprises executing a detection rule, and wherein the detection rule is used to determine that at least one of:

A) a particular event or combination of events of the event data,

B) a particular fact or combination of facts of one or more events of the event data, and C) a combination of one or more events and one or more facts of one or more events of the event data is a security event.

4. The computer-implemented method of claim 1, wherein executing a at least one of the first rules comprises executing a pre-selection rule, and wherein the pre-selection rule is used to determine that at least one of:

A) a particular event or combination of events of the event data,

B) a particular fact or combination of facts of one or more events of the event data, and C) a combination of one or more events and one or more facts of one or more events of the event data is or continues to be a potential security event, and wherein executing at least one of the second rules comprises executing a detection rule, and wherein the detection rule is used to determine that the at least one of:

A) the particular event or combination of events of the event data,

B) the particular fact or combination of facts of one or more events of the event data, and C) the combination of one or more events and one or more facts of one or more events of the event data is a security event, wherein a first total number of particular events, particular facts, and combinations are processed with the pre-selection rule, wherein a second total number of particular events, particular facts, and combinations are processed with the detection rule, and wherein the second total number is less than the first total number.

5. A system, comprising:

one or more processors; and a memory storing executable instructions that, upon execution by the one or more processors, cause the system to execute operations to:

determine one or more security events in a multi-stage process by at least:

identifying, in a first stage of the multi-stage process, a first rule set of the plurality of rule sets, the first rule set comprising rules for identifying potential security events;

executing, in the first stage, at least one of the first rules to determine that at least one of:

A) a particular event or combination of events of event data,

B) a particular fact or combination of facts of one or more events of the event data, and C) a combination of one or more events and one or more facts of one or more events of the event data is or continues to be at least one of a security event and a potential security event;

identifying, in a second stage of the multi-stage process, a second rule set of the plurality of rule sets, the second rule set comprising second rules for identifying security events, the second rules being more complex than the first rules; and executing, in the second stage and independently of the execution of the at least one of the first rules, at least one of the second rules to determine that the potential security event is or continues to be a security event; and generate a security alert based on the one or more security events.

6. The system of claim 5, wherein the at least one of the first rules is a pre-selection rule, and wherein the pre-selection rule is used to identify at least one of:

A) a particular event or combination of events as one of: being a potential security event, and continuing to be a potential security event;

B) a particular fact or combination of facts of one or more events as one of: being a potential security event, and continuing to be a potential security event; and C) a combination of one or more events and one or more facts of one or more events as one of: being a potential security event, and continuing to be a potential security event.

7. The system of claim 5, wherein the at least one of the second rules is a detection rule, and wherein the detection rule is used to identify at least one of:

A) a particular event or combination of events as being a security event;

B) a particular fact or combination of facts of one or more events as being a security event; and C) a combination of one or more events and one or more facts of one or more events as being a security event.

8. The system of claim 5, wherein the at least one: particular event or combination of events, particular fact or combination of facts of one or more events, and combination of one or more events and one or more facts of one or more events identified as being a security event is identified as being a potential security event based on a pre-selection rule.

9. The system of claim 8, wherein the at least one: particular event or combination of events, particular fact or combination of facts of one or more events, and combination of one or more events and one or more facts of one or more events identified as being a security event is identified as being the security event based on a detection rule.

10. The system of claim 5, wherein the plurality of rule sets includes one rule set comprising pre-selection rules and includes one rule set comprising detection rules.

11. The system of claim 5, wherein the plurality of rule sets comprises:
the first rule set comprising pre-selection rules;
the second rule set comprising detection rules; and
a third rule set comprising aggregation rules.

12. The system of claim 5, wherein the executable instructions, upon execution by the one or more processors, cause the system to execute operations to process the security alert according to an Enrichment, Suppression, and Routing (ESAR) methodology.

13. A non-transitory computer-readable storage medium storing computer-executable instructions that, when executed by one or more processors of a computing device, cause the computing device to:
determine one or more network security events in a multi-stage process by at least:
identifying, in a first stage of the multi-stage process, a first rule set of a plurality of network security rule sets, the first rule set comprising first rules for identifying potential network security events;
executing, in the first stage, at least one of the first rules to determine that at least one of:
A) a particular event or combination of events of event data,
B) a particular fact or combination of facts of one or more events of the event data, and
C) a combination of one or more events and one or more facts of one or more events of the event data
is or continues to be at least one of a network security event and a potential network security event;
identifying, in a second stage of the multi-stage process, a second rule set of the plurality of network security rule sets, the second rule set comprising second rules for identifying security events, the second rules being more complex than the first rules; and
executing, in the second stage and independently of the execution of the at least one of the first rules, at least one of the second rules to determine that the potential network security event is or continues to be a network security event; and
generate a network security alert based on the one or more network security events.

14. The non-transitory computer-readable storage medium of claim 13, wherein executing the at least one of the first rules comprises executing a pre-selection rule, and wherein the pre-selection rule is used to determine that at least one of:
A) a particular event or combination of events of the event data,
B) a particular fact or combination of facts of one or more events of the event data, and
C) a combination of one or more events and one or more facts of one or more events of the event data
is or continues to be a potential network security event.

15. The non-transitory computer-readable storage medium of claim 13, wherein executing the at least one of the second rules comprises executing a detection rule, and wherein the detection rule is used to determine that at least one of:
A) a particular event or combination of events of the event data,
B) a particular fact or combination of facts of one or more events of the event data, and
C) a combination of one or more events and one or more facts of one or more events of the event data
is a network security event.

16. The non-transitory computer-readable storage medium of claim 13, wherein in the first stage at least one: particular network event or combination of network events, particular fact or combination of facts of one or more network events, and combination of one or more network events and one or more facts of one or more network events is identified is a potential network security event based on a pre-selection rule, and wherein in the second stage the at least one: particular network event or combination of network events, particular fact or combination of facts of one or more network events, and combination of one or more network events and one or more facts of one or more network events is identified as being a network security event is a security event.

17. The non-transitory computer-readable storage medium of claim 16, wherein identifying in the second stage that the at least one: particular network event or combination of network events, particular fact or combination of facts of one or more network events, and combination of one or more network events and one or more facts of one or more network events is a network security event is based on a detection rule.

18. The non-transitory computer-readable storage medium of claim 13, wherein the at least one of the first rules is generated by a method comprising:
identifying one or more portions of a new rule which overlaps a preexisting rule in a set of rules available for use;
removing the one or more portions from the new rule; and
adding the new rule to the set of rules available for use.

19. The non-transitory computer-readable storage medium of claim 13, wherein the at least one of the second rules is generated by a trained machine learning system in response to a natural language description.

20. The non-transitory computer-readable storage medium of claim 13, wherein executing the at least one of the second rules comprises operating a trained machine learning system.

* * * * *